017 # United States Patent [19]

Keohan et al.

[11] Patent Number: 4,634,610
[45] Date of Patent: Jan. 6, 1987

[54] HEAT CURABLE SILICONE POLYIMIDE COMPOSITIONS

[75] Inventors: Francis L. Keohan, Schenectady; Larry N. Lewis, Scotia, both of N.Y.

[73] Assignee: General Electric Company, Schenectady, N.Y.

[21] Appl. No.: 793,359

[22] Filed: Oct. 31, 1985

[51] Int. Cl.$^4$ .............................................. B05D 3/02
[52] U.S. Cl. ................................... 427/387; 525/431; 528/15; 528/26; 528/28; 528/31; 528/41
[58] Field of Search ..................... 525/431; 528/15, 31, 528/26, 28, 41; 427/387

[56] References Cited

U.S. PATENT DOCUMENTS

| | | | |
|---|---|---|---|
| 4,517,342 | 5/1985 | Ryang | 525/431 |
| 4,522,985 | 6/1985 | Ryang | 525/431 |
| 4,533,737 | 8/1985 | Ryang | 548/110 |

*Primary Examiner*—Melvyn I. Marquis
*Attorney, Agent, or Firm*—William A. Teoli; James C. Davis, Jr.; James Magee, Jr.

[57] ABSTRACT

Silicone polyimides can be used as a one or two package heat curable composition when cured by silicon vinyl silicon-hydride addition with a cyclometallized platinum phosphite catalyst.

9 Claims, No Drawings

HEAT CURABLE SILICONE POLYIMIDE COMPOSITIONS

CROSS-REFERENCE TO RELATED APPLICATIONS

Reference is made to copending application Ser. No. 793,395 of Larry N. Lewis, "Heat Curable Siloxane", assigned to the same assignee as the present invention and incorporated herein by reference.

BACKGROUND OF THE INVENTION

The present invention relates to heat curable compositions resulting from the use of a cyclometallized platinum phosphite catalyst, an imide substituted silicone block copolymer and a polyfunctional reactive organosilicon material capable of undergoing an ≡SiH or ≡SiC$_2$H$_3$ addition reaction with the imide substituted silicone block copolymer.

Prior to the present invention, room temperature vulcanizable polydiorganosiloxanes, for example, silanol terminated polydimethylsiloxanes were available in either one-package or two-package systems based on the type of moisture sensitive cross-linking agents utilized in the composition. A typical one-package system for example, is based on the use of methyltriacetoxysilane and a silanol terminated polydimethylsiloxane, as shown by Ceyzeriat, U.S. Pat. No. 3,133,891. A two-package system is shown by Nitzsche et al. U.S. Pat. No. 3,965,194. Nitzsche et al. require the blending of silanol terminated polydimethylsiloxane with a curing catalyst, such as ethyl orthosilicate in combination with dibutyltindilaurate. The two package system also requires mixing curing catalyst and silanol terminated polydimethylsiloxane prior to use.

The above described one-package and two-package room temperature vulcanizable compositions generally use a reinforcing filler, for example, a silica filler in amounts of from 5-300 parts, per 100 parts of silicone polymer, if improved tensile strength in the resulting cured product is desired.

Another procedure available for improving the toughness of cured silicone polymers is by introducing silarylenesiloxy units into the polymer chain. A copolymer is produced consisting essentially of diorganosiloxy units chemically combined with silarylenesiloxy units. Although these procedures can substantially enhance the modulus (psi) of the silicone polymer, such procedures are either uneconomic, or do not achieve the degree of toughness or elongation (%)×tensile (psi) desired in the end product.

Heat curable compositions which can be readily vulcanized with a platinum catalyst at temperatures of 25° C. or greater are described by Ryang, U.S. Pat. No. 4,517,342 assigned to the same assignee as the present invention and incorporated herein by reference. A norbornane silicone block copolymer having silicon hydride or silicon vinyl functional groups in the silicone block is used in combination with a platinum catalyst and a polyfunctional organosilicon material capable of undergoing a polyaddition reaction with such norbornane silicone block copolymer. Although the heat curable compositions of Ryang have been found to provide high strength silicone-polyimide elastomers, it often has been difficult to utilize these heat curable silicone polyimide composition in various elastomeric adhesive applications because cure of the silicone polyimide often results before it can be properly fabricated. It would be desirable, therefore, to have platinum catalyzed silicone polyimide compositions having sufficient pot life to allow the fabrication of the silicone polyimide before the platinum catalyst is activated.

The present invention is based on the discovery that certain cyclometallized platinum phosphite catalysts, as defined hereinafter, when utilized in effective amounts can provide heat curable silicone-polyimides which can be fabricated prior to cure and thereafter converted to high strength elastomers or silicone elastomeric adhesive. A one or two component heat curable polyimide composition is provided in the form of a silicone polyimide block copolymer in combination with polyfunctional organosilicon material capable of undergoing a polyaddition reaction with such silicone polyimide block copolymer.

STATEMENT OF THE INVENTION

There is provided by the present invention, a heat curable silicone polyimide composition comprising
(A) imide substituted silicone block copolymer having chemically combined blocks selected from
  (i) polydiorganosiloxane having chemically combined ≡SiH or ≡SiC$_2$H$_3$ units, and
  (ii) a mixture of (i) and polyimide;
(B) a polyfunctional organosilicon material having at least two chemically combined ≡SiH or ≡SiC$_2$H$_3$ units, and
(C) an effective amount of a cyclometallized platinum phosphite catalyst having the formula $$(RO)_2POR^1Pt[P(OR^2)_3]X, \qquad (1)$$

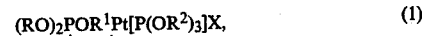

where (A) and (B) are capable of undergoing a polyaddition reaction involving addition between chemically combined ≡SiH units of (A) with ≡SiC$_2$H$_3$ units of (B), or ≡SiC$_2$H$_3$ units of (A) with ≡SiH units of (B), (B) is selected from the class consisting of organosilanes, organopolysilanes, organosiloxanes, organopolysiloxanes, and cyclopolyorganosiloxanes, and mixtures thereof, R and R$^2$ are selected from C$_{(1-14)}$ monovalent hydrocarbon radicals and substituted C$_{(1-14)}$ monovalent hydrocarbon radicals, R$^1$ is selected from C$_{(6-14)}$ divalent aromatic hydrocarbon radicals and substituted C$_{(6-14)}$ divalent aromatic hydrocarbon radicals and X is a halogen radical.

Imide substituted silicone block copolymers which can be used in the practice of the present invention can be made by effecting reaction between an anhydride terminated polydiorganosiloxane or a mixture of such dianhydride organosiloxane with organic aromatic dianhydride and an amine terminated polydiorganosiloxane or a mixture thereof with organic diamine. Some of the anhydride terminated polydiorganosiloxanes are shown by Ryang, U.S. Pat. No. 4,381,396 for "Silylnorbornane Anhydrides and Method For Making" incorporated herein by reference and assigned to the same assignee as the present invention. Additional anhydride terminated polydiorganosiloxanes are shown by copending application Ser. No. 638,725 filed Dec. 5, 1984 of Jonathan D. Rich for "Polyanhydride Siloxane and Polyimide Siloxane Obtained Therefrom" which is also incorporated herein by reference and assigned to the same assignee as the present invention.

Some of the anhydride terminated polydiorganosiloxanes which can be used in the practice of the present invention to make the imide substituted silicone block copolymer are further shown by the following formulas:

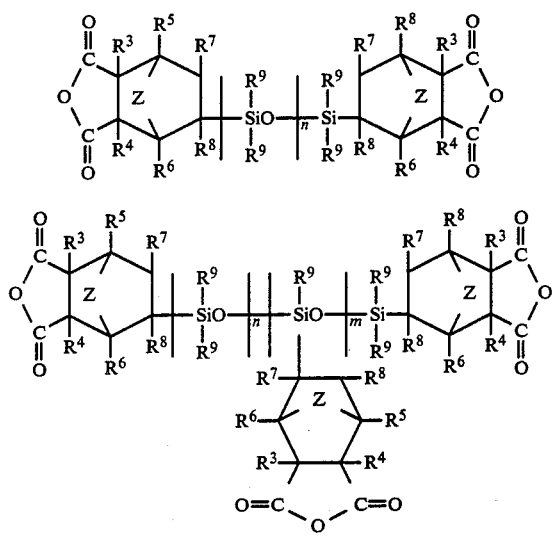

where $R^3$-$R^9$, and Z are defined below, n is an integer equal to 1 to 2000 inclusive, m is an integer equal to 0 to 500 inclusive and the sum of m+n is equal to 1 to 2000 inclusive.

Radicals included in $R^3$-$R^8$ are, for example, members selected from hydrogen, halogen, $C_{(1-13)}$ monovalent hydrocarbon radicals and substituted $C_{(1-13)}$ monovalent hydrocarbon radicals, Z is selected from O and $C(R)_2$ and $R^9$ is selected from $C_{(1-13)}$ monovalent hydrocarbon radicals and substituted monovalent hydrocarbon radicals and is preferably a mixture of monovalent hydrocarbon radicals or substituted derivatives thereof which are free of olefinic unsaturation and $C_{(2-10)}$ olefinically unsaturated aliphatic radicals.

Some of the preferred anhydride terminated polydiorganosiloxanes which are included within the practice of the present invention for making the imide substituted silicone block copolymers are, for example,

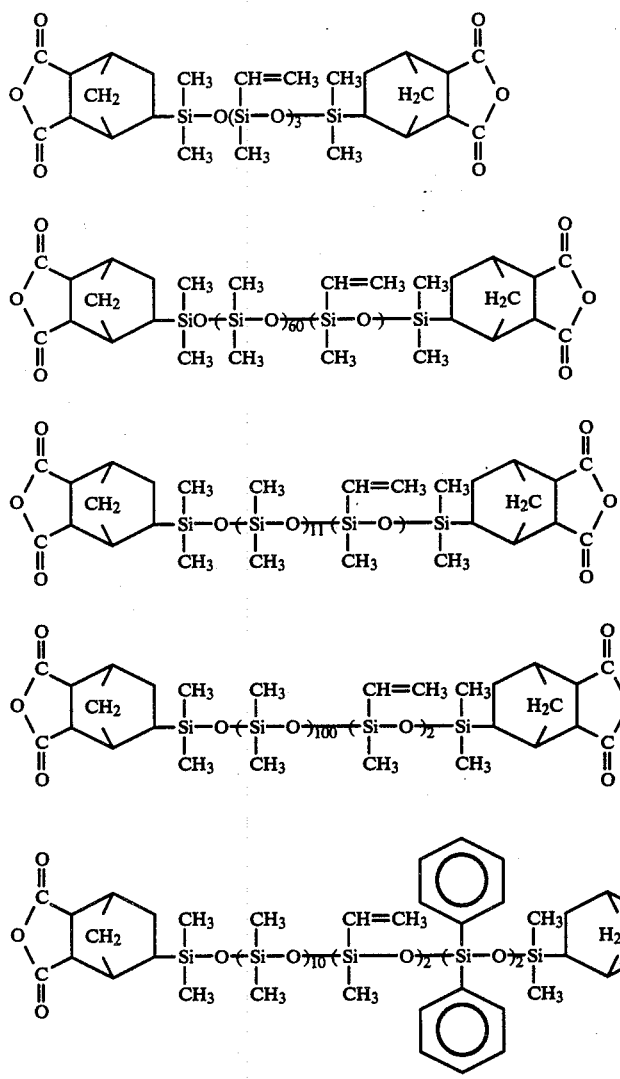

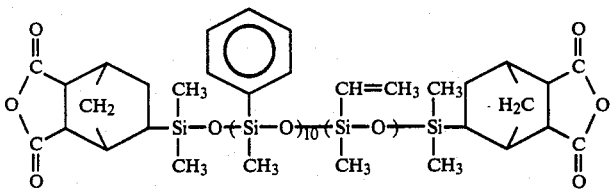

Among the organic diamines which can be utilized in the practice of the present invention to make the imide substituted silicone block copolymer are, for example,
o-phenylenediamine;
m-phenylenediamine;
p-phenylenediamine;
4,4'-diaminodiphenylpropane;
4,4-diaminodiphenylmethane (commonly named 4,4-'-methylenedianiline);
4,4'-diaminodiphenylmethane (commonly named 4,4'-thiodianiline);
4,4'-diaminodiphenyl ether (commonly named 4,4'-oxydianiline);
1,5-diaminonaphthalene;
3,3'-dimethylbenzidine;
3,3'-dimethoxybenzidine;
2,4-bis($\beta$-amino-t-butyl)toluene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane;
and mixtures of such diamines.

The polyfunctional organosilicon material capable of undergoing a polyaddition reaction with the imide substituted silicone block copolymer, is preferably has chemically combined ≡SiH units and is selected from organosilanes, organopolysilanes, organosiloxanes, organopolysiloxanes and cyclopolyorganosiloxanes and mixtures thereof. The polyfunctional organosilicon material can contain from 0.2 to 0.8 moles of chemically combined ≡SiH units, per mole of chemically combined organosilicon units, and preferably 0.5 to 0.6 mole of ≡SiH units. Additional silicon hydride containing siloxane can be used in making the heat curable compositions of the present invention as shown by Faltynek, U.S. Pat. No. 4,329,274 assigned to the ame assignee as the present invention and incorporated herein by reference. For example, there can be used silicon hydride containing siloxane selected from the class consisting of silicon hydride resin consisting essentially of chemically combined diorgano hydride siloxy units and SiO$_2$ units, where the organo radicals attached to silicon are the ame as R$^9$, linear hydride polysiloxane consisting essentially of chemically combined hydro organo siloxy units and diorgano siloxy units as previously defined and a linear hydride polysiloxane coupler consisting essentially of chemically combined diorganosiloxy units and terminal diorganohydride siloxy units and mixtures thereof.

The imide substituted silicone block copolymer can have silicone blocks having 0.01 to 10 mole percent of chemically combined silicon vinyl units based on the total moles of chemically combined diorganosiloxy units. It can be made by equilibrating anhydride terminated siloxane or amine terminated polydiorganosiloxane with cylcopolydiorganosiloxane and vinyl containing cyclopolydiorganosiloxane which is 2,4,6-trivinyl trimethylcyclotrisiloxane or 2,4,6,8-tetravinyl tetramethylcyclotetrasiloxane. The acid catalyzed equilibration of vinyl functional siloxanes such as sulfuric acid catalyzed can be carried out at room temperature or below in order to minimize desirable side reactions of the vinyl groups.

A preferred procedure for making imide substituted silicone polymer is by utilizing substantially equal molar amounts of diamine which means amine terminated polydiorganosiloxane or mixtures thereof with organic diamine and dianhydride which means anhydride terminated polydiorganosiloxane or mixtures thereof with organic dianhydrides along with an effective amount of chain stopping organic anhydride such as phthalic anhydride, norbornene anhydride. In the polymerization of the imide substituted silicone block copolymer there can be utilized, organic solvents for example orthodichlorobenzene and temperatures in the range of from 140° to 200° C. can be employed. Reaction can be conducted in an inert atmosphere, for example, under nitrogen to minimize undesirable side reactions. Reaction times can vary from 30 minutes or less to 3 hours, depending upon the nature of the reactants, the molecular weight of the imide substituted silicone block copolymer.

In instances where amine terminated disiloxane is used, a single step equilibration scheme using base catalysts such as tetramethylammoniumhydroxide, oxides and hydroxides of alkali metals and alkali metal silanolate salts can be employed. The pendant vinyl functional imide substituted silicone block copolymer can be prepared by a two-step solution polycondensation reaction between the anhydride terminated polydiorganosiloxane or amine capped silicone polymers, aromatic diamines and aromatic dianhydrides. Aromatic dianhydrides which can be employed in addition to the aforementioned anhydride terminated polydiorganosiloxanes are, for example, pyromellitic dianhydride, trimellitic anhydride, benzophenone dianhydride, etc.

Organic acid and acid anhydrides as well as concentrated sulfuric acid and fuming sulfuric acid can be used as catalysts in the equilibration of anhydride capped silicone polymers. When equilibrating amine capped siloxanes, basic catalysts such as alkali metal hydroxides and oxides and silanolate salts may be employed.

The cyclometallized platinum phosphite catalysts which can be used in the practice of the present invention can be made by effecting reaction between an alkali metal polychloroplatinum compound, such as disodium platinum tetrachloride with an alkyl or aryl phosphite and ethanol followed by heating the resulting chlorinated platinum phosphite at a temperature in the range of from 150° C. to 200° C. in the presence of an organic solvent, such as decalin, for 18 hours. An effective amount of cyclometallized platinum phosphite catalyst is sufficient cyclometallized platinum phosphite to provide from 10 ppm to 100 ppm of platinum based on the weight of heat curable silicone polyimide composition.

Some of the cyclometallized phosphite catalysts which can be used in the practice of the invention are, for example where Ph is phenyl,

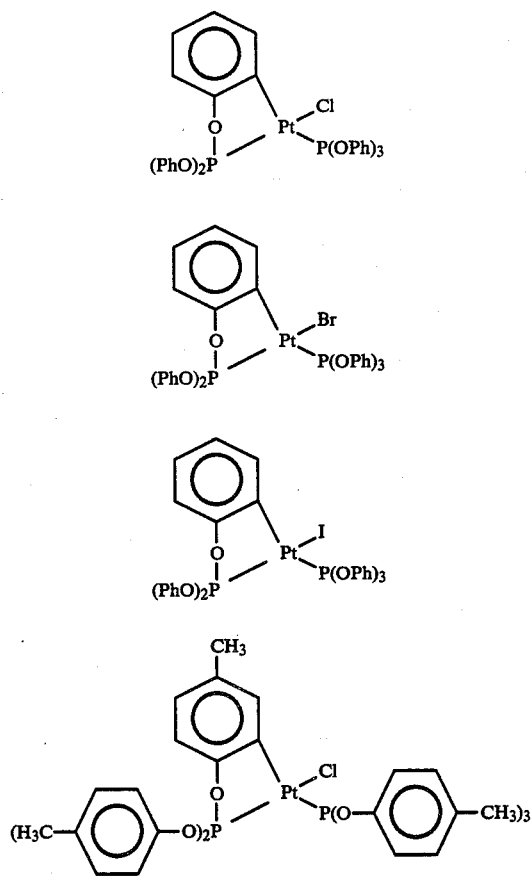

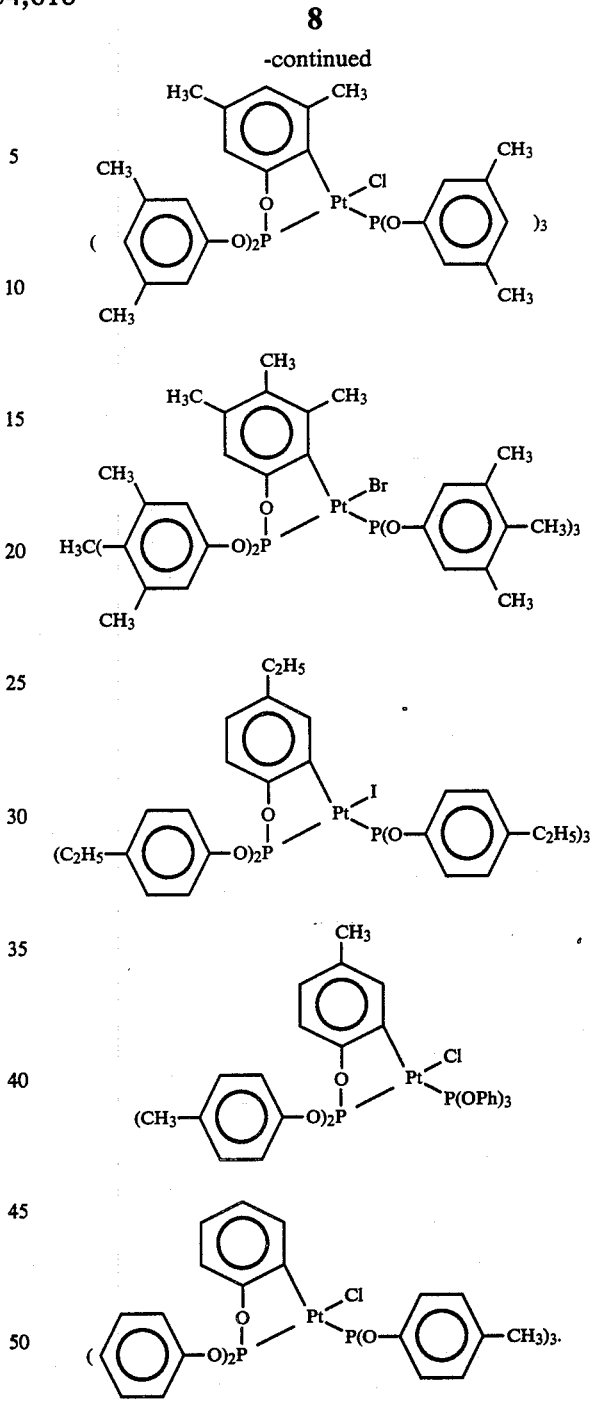

The heat curable silicone polyimide compositions of the present invention can be made into a one package or two package system. In instances where a one package system is desired it is preferred to utilize an organic solvent mixture of the imide substituted silicone copolymer. Suitable inert organic solvents can be used such as chloroform, methylene chloride, chlorobenzene, tetrahydrofuran, trichloroethylene. The polyfunctional organosilicon material can be used along with the platinum catalyst followed by casting the resulting heat curable silicone polyimide composition to produce a one package film. Preferably, a two package system can be made under neat conditions by milling the platinum catalyst into the imide substituted silicone copolymer while in the molten state followed by adding the polyfunctional organosilicon material at temperatures sufficient to effect the cure of the mixture such as 100° C. to 200° C. and preferably 120° C. to 150° C.

Various fillers and pigments can be incorporated into the heat curable silicone polyimide compositions of the present invention. For example, there can be used, for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of imide substituted silicone block copolymers can be employed. In such applications, the filler can consist of a major amount of extending materials, such as ground quartz, polyvinyl chloride, or mixtures thereof, preferably having an average particle size in the range of from about 1 to 10 microns.

In order that those skilled in the art will be better able to practice the invention the following examples are given by way of illustration and not by way of limitations. All parts are by weight.

ml of trifluromethane sulfonic anhydride and 15 ml of water were added by syringe. The mixture was stirred at 70° C. under a nitrogen atmosphere for 18 hours.

A similar procedure was conducted to equilibrate 17 gms of octamethylcyclotetrasiloxane, 1.37 gms ($5.29 \times 10^{-3}$ moles) of 2,4,6-trivinyltrimethylcyclotrisiloxane, 15 ml of anhydrous toluene, 0.5 ml trifluoromethanesulfonic acid in 5 ml of water. A mixture was stirred at room temperature under a nitrogen atmosphere for 18 hours.

The equilibrated dimethyl methyl vinyl cyclic siloxane mixture was added to the anhydride capped equilibrated silicone mixture which had been cooled to room temperature. There was also added 15 ml of anhydrous toluene to facilitate the transfer. The solution was allowed to react at room temperature under a nitrogen atmosphere for 18 hours. The equilibration was quenched by treatment with powdered magnesium sulfate, sodium bicarbonate and activated charcoal. A slurry was filtered, the solvent removed under reduced pressure and the unreacted cyclic siloxane was removed by vacuum stripping at pressures below 1 mm mercury at a temperature of 100° C. There was obtained 74.69 gms of product. Based on method of preparation and $^{29}$SiNMR analysis the product was anhydride terminated polydimethylsiloxane having chemically combined methyl vinyl siloxy units having the formula

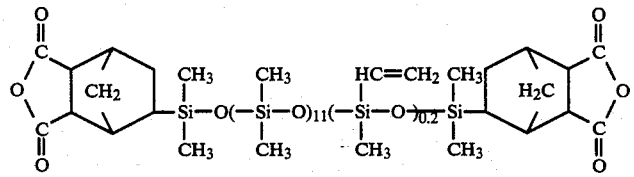

EXAMPLE 1

There was dissolved 1.47 g (1.03 mmol) of Na$_2$PtCl$_4$.4H$_2$O in 11 ml of ethanol. The solution was combined with 0.716 g of triphenylphosphate in 4 ml of ethanol. The combined solutions were agitated and gently heated for 2 minutes and then cooled. A white solid separated which was collected by filtration. It was washed with H$_2$O/ethanol, ethanol and heptane. The solid was recrystallized from CH$_2$Cl$_2$/methanol. There was obtained 0.42 g of PtCl$_2$[P(OC$_6$H$_5$)$_3$]$_2$ having a melting point of 187°–9° C.

The above platinum phosphorous compound was dissolved in 6 ml of decalin. The solution was heated to reflux under nitrogen for 17 hours. The solution was cooled to room temperature. A white solid separated which was collected by filtration and washed with hexane, methanol, water and hexane. The solid was recrystallized from CH$_2$Cl$_2$/methanol. There was obtained 0.22 g or a 64% yield of

having a MP of 155° C.

A mixture of 30 gms ($6.48 \times 10^{-2}$ moles) of 5,5'-(1,1,3,3-tetramethyl-1,1,3-disiloxanyldiol)-bis-norbornane-2,3-dicarboxylic anhydride, 40.7 gms ($1.945 \times 10^{-1}$ mole) of octamethylcyclotetrasiloxane and 80 ml of toluene was refluxed with stirring under a nitrogen atmosphere. It was separated approximately 10 ml of solvent. The solution was cooled to 70° C. in 0.15

A mixture of 18 gms ($1.302 \times 10^{-2}$ moles), the above described vinyl anhydride terminated siloxane, 1.6345 gms ($1.512 \times 10^{-2}$ moles) of metaphenylene diamine, 0.1993 (1 weight percent) of 2-hydroxypyrridine and 35 ml of orthodichlorobenzene was heated to 120° C. and stirred for 20 minutes. The temperature of the mixture was then raised to 150° C. and the solution heated for 2 hours. There was then added to the solution 1.4835 gms ($2.850 \times 10^{-3}$ moles) of 2,2-bis(4-(3,4-dicarboxyphenoxy)phenol(propane)dianhydride. The mixture was then heated for 1 hour at 150° C. Then the temperature was raised to 180° C. for an additional hour. The mixture was then heated to 200° C. and approximately 10 ml of solvent and water were distilled off. The temperature was then lowered to 180° C. and the reaction continued for approximately 20 hours under a nitrogen atmosphere. The solvent was then removed under reduced pressure at 150° C. and a product was isolated. The product was dissolved in methylene chloride and the solution extracted repeatedly with dilute hydrochloric acid and distilled water. The solution was then dried over anhydrous magnesium sulfate, filtered and the solvent removed by rotary evaporation and high vacuum stripping. There was obtained 16 gms of product -presenting a yield of 91%. Based on method of preparation the product was a vinyl containing silicone polyimide having terminal norbornane anhydride groups and phthalic anhydride groups.

There was prepared a solution in 25 gms of chloroform of 6 gms of the above vinyl containing silicone polyimide, and 0.06 gms of a methyl hydrogen siloxane fluid having a viscosity of from 50-150 centipoise at 25° C. and consisting essentially of chemically combined methyl hydrogen siloxy units and dimethyl siloxy units. The solution was filtered and to the filtrate there was added 30 μl of cyclometallized platinum phosphite catalyst as a 0.16% Pt solution in xylene. The solution was then cast onto a clean level glass plate and allowed to dry in air for 1 hour. There was obtained a film which was removed from the glass plate and dried in a vacuum oven for 20 hours at 45°-50° C. The film was then cut into 1"×0.5" pieces.

The same procedure was repeated except that in place of the cyclometallized phosphite platinum catalyst (phosphite) there was substituted 1,5-cyclooctadiene platinum dichloride (cyclooctadiene).

Lap shear specimens were prepared from standard aluminum alloy coupons with the various silicone polyimide copolymer films, phosphite and cyclooctadiene described above. Joints were formed by melting two film pieces onto the end of a coupon using the lower platen of a Carver press which had been heated to 150° C. The top coupon was placed over the polymer coated end and the assembly pressed at 2000 psi and 150° for 15 minutes. Little spaces (3 ml) and two auxiliary metal coupons were used in the preparation to keep a uniform pressure on the assembly and to maintain the space between the coupons for the adhesive. The assembly was removed from the Carver press and allowed to cool to room temperature. It was then disassembled to leave the lap shear joint. The specimens were then tested for lap shear strength using an Instron 4202. The following results were obtained where "hard block" indicates weight percent of polyimide based on silicone polyimide copolymer, "soft block" indicates weight percent dimethylsiloxane based on silicone polyimide copolymer and "extension" indicates the degree of elongation of the sample before delamination from the aluminum substrate.

TABLE I

| Catalyst | WT % Hard Block | WT % Soft Block | Lap Shear Strength (psi) | Extension (%) |
|---|---|---|---|---|
| phosphite | 8 | 92 | 800 | .03 |
| cyclo octadiene | 8 | 92 | 400 | .01 |

The above results show that the use of the (phosphite) platinum catalyst in the present invention provides lap shear joints having superior lap shear strength (psi) and average extension (%) as compared to compositions utilizing prior art platinum catalysts (cyclooctadiene). One possible explanation is that the cyclometallized platinum phosphite catalyst of the present invention was activated at a temperature exceeding 150° C., allowing for the melting of the resulting heat curable silicone polyimide prior to cure.

EXAMPLE 2

The procedure of Example 1 was repeated except that a silicone polyimide copolymer was used having 9-10% by weight of polyimide and 90-91% by weight of polydimethylsiloxane. In addition to the phosphite platinum catalyst of the present invention, there was used 10 ppm of Pt as a reaction product of chloroplatinic acid and alkanol shown by Lamoreaux U.S. Pat. No. 3,220,972 which was inhibited by 500 ppm of diallylmaleate as shown in U.S. Pat. No. 4,340,710. The following results were obtained where Lamoreaux means the aforementioned inhibited catalyst:

TABLE II

| Catalyst | WT % Hard Block | WT % Soft Block | Lap Shear Strength | Extension (%) |
|---|---|---|---|---|
| phosphite | 9 | 91 | 1100 | 0.04 |
| " | 10 | 90 | 1400 | 0.05 |
| Lamoreaux | 10 | 90 | 700 | .02 |

The above results show that the improved lap shear strength and extension % are obtained when the % polyimide is increased and the % polydimethylsiloxane decreased. In addition, the silicone-polyimide composition having the cyclometallized platinum phosphite catalyst provided superior results over the compositions of the prior art.

EXAMPLE 3

The procedure of Example 1 was repeated utilizing the silicone polyimide having about 10% by weight of polyimide and 90% by weight of polydimethylsiloxane of Example 2 except that a variety of metal substrates in addition to aluminum alloy were used to make the lap shear joints. The following results were obtained.

TABLE III

| Substrate | Lap Shear (psi) | Extension (%) |
|---|---|---|
| Aluminum | 1400 | 0.05 |
| Etched Aluminum | 1300 | 0.05 |
| Steel Alloy | 1100 | 0.03 |
| Titanium Alloy | 1200 | 0.03 |

The above results show that the aluminum substrate provides a superior lap shear joint as compared to the other metallic substrates.

Although the above examples are directed to only a few of the very many variables which can be used in the practice of the present invention, it should be understood that the present invention is directed to a much broader variety of silicone polyimides and phosphite platinum catalysts as shown in the description preceding these examples. In addition the above invention is also directed to the following:

A method for binding a substrate using a hot melt silicone imide adhesive which comprises, (1) melting a mixture of an imide substituted silicone block copolymer having an average of 0.1 to 10 mol percent of chemically combined silicon vinyl siloxy units based on the total moles of diorganosiloxy units, a polyfunctional organosilicon hydride and an effective amount of a platinum catalyst, (2) allowing the liquid mixture of (1) to contact a substrate, and (3) heating the resulting composite of (2) to a temperature of 150° C.-200° C. under a pressure of 500 psi to 5000 psi to convert the hot melt silicone imide adhesive to a high strength adhesive.

What is claimed is:

1. A heat curable composition comprising
(A) imide substituted silicone block copolymer having chemically combined blocks selected from
   (i) polydiorganosiloxane having chemically combined ≡SiH or ≡SiC$_2$H$_3$ units, and
   (ii) a mixture of (i) and polyimide, (B) a polyfunctional organosilicon material having at least two chemically combined ≡SiH units or ≡SiC$_2$H$_3$ units, and (C) an effective amount of a cyclometallized platinum phosphite catalyst having the formula $$(RO)_2POR^1Pt[P(OR^2)_3]X,$$
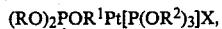

where (A) and (B) are capable of undergoing a polyaddition reaction involving addition between chemically combined ≡SiH units of (A) with ≡SiC$_2$H$_3$ units of (B), or ≡SiC$_2$H$_3$ units of (A) with ≡SiH units of (B), (B) is selected from the class consisting of organosilanes, organopolysilanes, organosiloxanes, organopolysiloxanes, and cyclopolyorganosiloxanes, and mixtures thereof, R and R$^2$ are selected from C$_{(1-14)}$ monovalent hydrocarbon radicals and substituted C$_{(1-14)}$ monovalent hydrocarbon radicals, R$^1$ is selected from C$_{(6-14)}$ monovalent aromatic hydrocarbon radicals and substituted C$_{(6-14)}$ monovalent aromatic hydrocarbon radicals and X is a halogen radical.

2. A heat curable composition in accordance with claim 1, where the cyclometallized platinum phosphite catalyst is ortho metallated.

3. A heat curable composition in accordance with claim 1, where the imide substituted silicone block copolymer is a norbornane or norbornene silicone block copolymer.

4. A heat curable composition in accordance with claim 1, where the imide substituted polymer is a norbornane polydiorganosiloxane.

5. A one package heat curable composition in accordance with claim 1.

6. A heat curable silicone-elastomeric adhesive in accordance with claim 1.

7. A composition in accordance with claim 1 which is in the form of a sheet.

8. A method for binding a substrate using a hot melt silicone imide adhesive which comprises, (1) melting a mixture of an imide substituted silicone block copolymer having an average of 0.1 to 10 mol percent of chemically combined silicon vinyl siloxy units based on the total moles of diorganosiloxy units, a polyfunctional organosilicon hydride and an effective amount of a platinum catalyst having the formula, $$(RO)_2POR^1Pt[P(OR^2)_3]X,$$
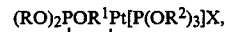

where R and R$^2$ are selected from C$_{(1-14)}$ monovalent hydrocarbon radicals and substituted C$_{(1-14)}$ monovalent hydrocarbon radicals, R$^1$ is selected from C$_{(6-14)}$ monovalent aromatic hydrocarbon radicals and substituted C$_{(6-14)}$ monovalent aromatic hydrocarbon radicals and X is a halogen radical.

9. A method in accordance with claim 8 where the substrate is a metal.

* * * * *